(12) United States Patent
Bevans et al.

(10) Patent No.: US 8,387,852 B2
(45) Date of Patent: Mar. 5, 2013

(54) WELDED TAILORED BLANKS THAT ALLOW FOR PART CURVATURE

(75) Inventors: Robert R. Bevans, St. Charles, MO (US); Edward H. Gerding, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 1714 days.

(21) Appl. No.: 11/328,806

(22) Filed: Jan. 9, 2006

(65) Prior Publication Data
US 2007/0158394 A1 Jul. 12, 2007

(51) Int. Cl.
*B23K 20/12* (2006.01)
(52) U.S. Cl. ...................... 228/112.1; 228/2.1
(58) Field of Classification Search ............ 228/2.1, 228/112.1
See application file for complete search history.

(56) References Cited

U.S. PATENT DOCUMENTS

| 5,460,317 A | 10/1995 | Thomas et al. ............ 228/112.1 |
| 2001/0052561 A1* | 12/2001 | Wollaston et al. ............ 244/132 |
| 2004/0256440 A1* | 12/2004 | Slattery ...................... 228/112.1 |
| 2005/0127140 A1 | 6/2005 | Slattery ...................... 228/112.1 |

FOREIGN PATENT DOCUMENTS
JP 2002160077 A * 6/2002

* cited by examiner

*Primary Examiner* — Devang R Patel
(74) *Attorney, Agent, or Firm* — Ostrager Chong Flaherty & Broitman P.C.

(57) ABSTRACT

A method of making tailored blanks in accordance with one embodiment comprises the steps of: (a) friction welding first and second structural members together along a straight interface to form a weld joint, each of the first and second structural members having a respective polygonal profile that is not a parallelogram; and (b) machining the first and second structural members to form first and second curved contours that each intersect the weld joint.

7 Claims, 3 Drawing Sheets

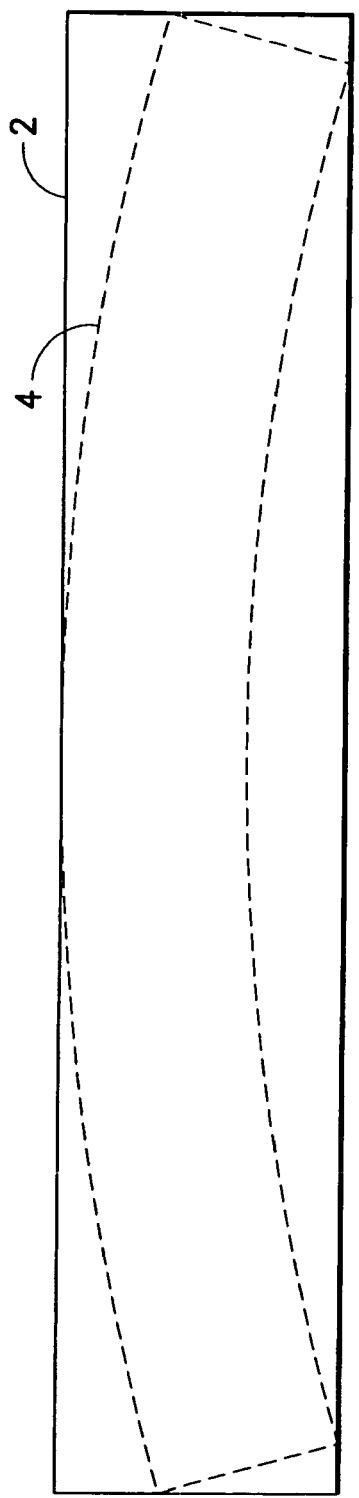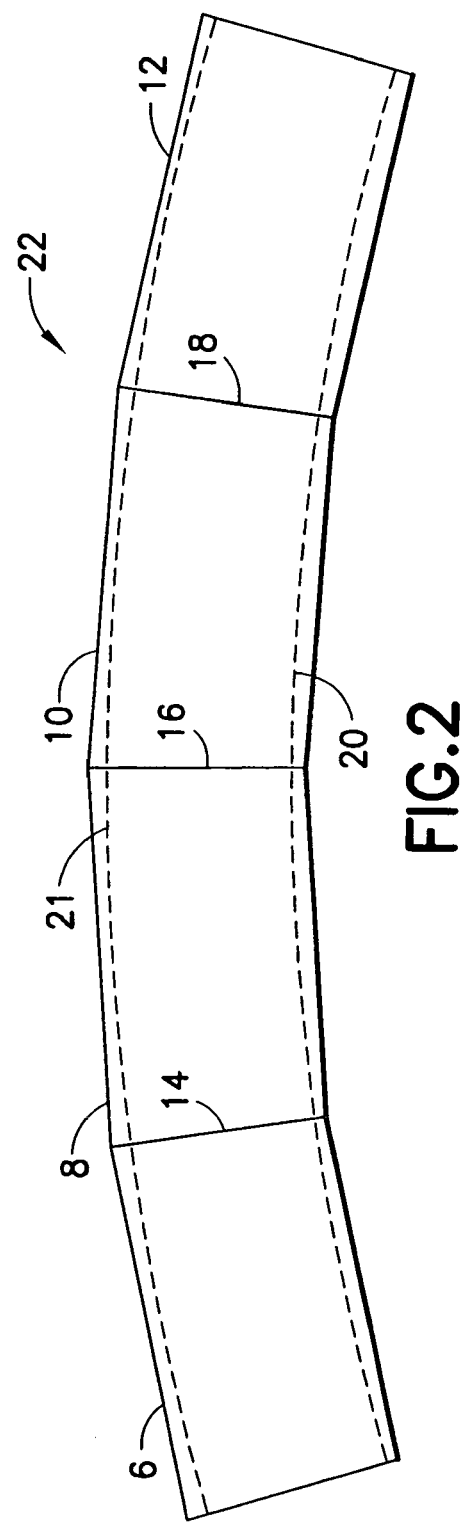

WELDED TAILORED BLANKS THAT ALLOW FOR PART CURVATURE

BACKGROUND OF THE INVENTION

This invention relates to friction welding and, more specifically, to friction welding of one or more structural members to form a tailored blank.

Hogout machining generally refers to a process of forming a structure or structural member by removing excess material from a piece of stock material, such as a plate or block, to arrive at the desired configuration and dimensions. Oftentimes when practicing hogout machining, the dimensions and configuration of the final structure are such that appreciable amounts of material must be removed. Thus, while hogout machining provides a method for forming structures or structural members having complex configurations, hogout machining can be costly due to the relatively large amount of excess material or scrap that typically must be removed and because the machining process can be time consuming and labor intensive. Hogout machining also can cause excessive wear on the cutting machine and tools, which can result in machine downtime and/or tool breakage that in turn can adversely affect the tolerances of the finished structure. In addition, the availability of stock sizes of material limits the overall dimensions of a structure or structural member formed by hogout machining.

In seeking to reduce material waste and machining times, other methods are used for forming the stock material to be used in machining a structure or structural member. For example, one method is machined forging, which refers to the process of machining a part from a piece of forged stock material that approximates the final configuration. When machined forging is used, the amount of machining can be reduced because the forged stock material can be hand or die forged to dimensions that more closely approximate the desired dimensions of the finished assembly. However, the production of forged stock material can be time consuming and labor intensive and, in the case of die forgings, can require the production of costly forging dies. Die forgings can require ultrasonic inspection, as the forging process can cause internal cracks or other defects. Additionally, both die and hand forging can cause residual stresses in the forged stock material that can remain in the finished structure or structural member. Residual stresses can necessitate slower cutting speeds when hogout machining and can adversely affect the material properties and tolerances of the finished structure.

Many complex machined parts are curved due to the mold line contour that is required for many parts, in particular, fuselage frames or longerons. The manufacture of such curved structures using hogout machining results in great material waste.

There is a need for a method of manufacturing curved machined structures with a minimum of material waste.

BRIEF DESCRIPTION OF THE INVENTION

The invention is directed to methods of friction welding structural members to make tailored blanks that approximate the desired dimensions and configuration of a desired final curved structural assembly, that is, the tailored blank requires little machining or other subsequent processing to form the desired final curved structural assembly. The invention is also directed to the resulting tailored blanks.

One aspect of the invention is a method of making a curved structural assembly comprising the following steps: (a) friction welding first and second structural members together along a straight interface to form a weld joint, each of the first and second structural members having a respective polygonal profile that is not a parallelogram; and (b) machining the first and second structural members to form first and second curved contours that each intersect the weld joint.

Another aspect of the invention is a method of making a curved structural assembly comprising the following steps: (a) friction welding first and second structural members together along a straight interface to form a first weld joint, each of the first and second structural members having a respective polygonal profile that is not a parallelogram; (b) friction welding the second structural member and a third structural member together along a straight interface to form a second weld joint, the third structural member having a polygonal profile that is not a parallelogram, and the second weld joint being not parallel to the first weld joint; and (c) machining the first, second and third structural members to form first and second curved contours that each intersect the first and second weld joints.

A further aspect of the invention is a method of making a curved structural assembly comprising the following steps: (a) forming first, second and third structural members each having a predetermined thickness and a respective trapezoidal shape in a plane perpendicular to the thickness direction with a long base and a short base that are mutually parallel and sides that are not mutually parallel; (b) friction welding one side of the first structural member to one side of the second structural member to form a first weld joint, the long bases of the first and second structural members extending near one end of the first weld joint, and the short bases of the first and second structural members extending near the other end of the first weld joint; (c) friction welding the other side of the second structural member to one side of the third structural member to form a second weld joint that is not parallel to the first weld joint, the long bases of the second and third structural members extending near one end of the second weld joint, and the short bases of the first and second structural members extending near the other end of the second weld joint; and (d) machining the first, second and third structural members to form first and second curved contours that each intersect the first and second weld joints.

Yet another aspect of the invention is a tailored blank comprising first, second and third structural members, each having a respective polygonal profile that is not a parallelogram, wherein the first and second structural members are joined together along a first weld joint, while the second and third structural members are joined together along a second weld joint that is not parallel to the first weld joint, the first and second weld joints being formed by friction welding.

Other aspects of the invention are disclosed and claimed below.

BRIEF DESCRIPTION OF THE DRAWINGS

FIG. 1 is a drawing showing a planar view of a rectangular plate suitable for being hogout machined to form a curved part (indicated by dashed lines).

FIG. 2 is a drawing showing a planar view of a tailored blank suitable for being machined to form a curved part (indicated by dashed lines), and formed by friction welding a plurality of trapezoidal plates, angled side to angled side.

Reference will hereinafter be made to the drawings in which similar elements in different drawings bear the same reference numerals.

DETAILED DESCRIPTION OF THE INVENTION

Figure 3:
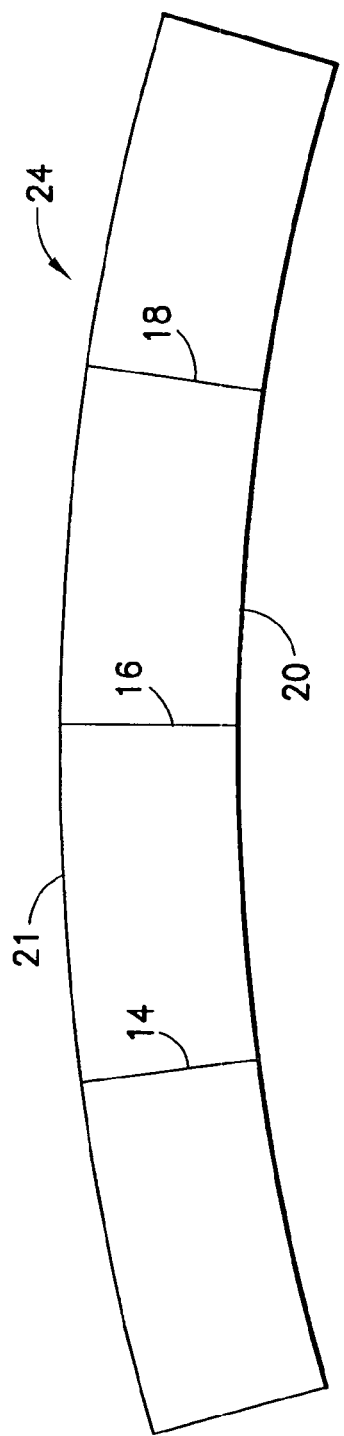
FIG. 3 is a drawing showing a planar view of the final curved structural assembly after machining the tailored blank shown in FIG. 2.

FIG. 1 shows a typical hogout machining process whereby a rectangular plate 2 is machined to formed a curved structural member 4, indicated by dashed lines. In this particular example, the curved structural member 4 has concentric inner and outer arc-shaped contours. However, the machining could be carried out in such a way that the curved structural member has a radius of curvature that varies along the length of the member. In either case, the areas within the rectangle 2 and outside the curved structural member 4 in FIG. 1 represent the material that is removed during machining. As the amount of material to be removed by machining increases, so does the cost of manufacture. Therefore, it is desirable to minimize the amount of material that needs to be removed by machining.

In accordance with various embodiments to be disclosed hereinafter, a desired final curved structural assembly is manufactured by friction welding structural members to form a tailored blank, which tailored blank is then machined to the desired final shape. The structural members would typically have a predetermined thickness and respective polygonal profiles when viewed along a line parallel to the thickness direction, which profiles may be similar or identical in size and shape or may be different depending on the desired curvature of the final assembly and whether the radius of curvature varies along the length of the curved final structural assembly. Typically, the structural members will be plates of the same thickness, blocks of the same thickness or beams of the same thickness.

The tailored blank can be formed using any friction welding technique that allows for the joinder of abutting substantially planar contact surfaces. Exemplary processes suitable for this purpose are linear friction welding and friction stir welding. Various embodiments wherein the structural members are friction welded to form a tailored blank suitable for being machined into a curved structural assembly will be described with reference to FIGS. 2 and 3.

In accordance with a first embodiment of the invention, a tailored blank 22 suitable for machining into a final curved structural assembly 24 is shown in FIG. 2, The tailored blank 22 is configured so that the amount of material removed to arrive at the final structure is less than the amount of material removed during the hogout machining process depicted in FIG. 1. In the example depicted in FIG. 2, the tailored blank 22 comprises first through fourth structural members respectively designated by the numerals 6, 8, 10 and 12. In this particular example, each of the structural members 6, 8, 10, 12 has the same trapezoidal profile. More specifically, each trapezoid comprises a long base, a short base that is parallel to the long base, and a pair of sides that are not mutually parallel. For purposes of this example only, it will be presumed that the sides are disposed at supplementary angles relative to the bases.

The tailored blank depicted in FIG. 2 approximates a segmented arc, with each trapezoidal structural member 6, 8, 10, 12 comprising a respective segment. The long bases of the trapezoids are disposed along the convex outer periphery of the segmented arc, while the short bases of the trapezoids are disposed along the concave inner periphery of the segmented arc. FIG. 2 shows an embodiment wherein the long bases of contiguous trapezoids have respective vertices that are immediately adjacent, as are the vertices of the short bases.

Still referring to FIG. 2, the structural members 6 and 8 are friction welded to each other along a straight interface where respective sides of the trapezoids abut each other, thereby forming a friction weld joint 14. Similarly, the structural members 8 and 10 are friction welded to each other and structural members 10 and 12 are friction welded to each other along respective straight interfaces where respective sides of the trapezoids abut each other, thereby forming respective friction weld joints 16 and 18.

It will be apparent to a person skilled in the art of making tailored blanks by friction welding that the shapes of the structural members need not be trapezoids having sides disposed at supplementary angles. Other angles may be used. Also, their shapes need not be trapezoidal, but could be other quadrilateral shapes. Even polygonal shapes having five or more sides can be used. Preferably, however, whichever polygonal shapes are employed, they are selected such that the structural elements can be arranged in face-to-face relationship and friction welded to form a segmented tailored blank that can be machined to make a curved structure.

FIG. 3 shows a curved structural assembly 24 formed by machining the tailored blank 22 along the dashed curved lines shown in FIG. 2. In this particular example, the final machined structural member assembly has concentric inner and outer arc-shaped contours 20 and 21, which respectively intersect each of the friction weld joints 14, 16, 18. The result is an arc-shaped final structural assembly comprising four arc-shaped segments joined end-to-end by friction welds. However, the machining could be carried out in such a way that the curved structural member has a radius of curvature that varies along the length of the member. In either case, the areas within the respective trapezoids of structural members 6, 8, 10, 12 that respectively lie outside of the convex outer contour 21 and inside of the concave inner contour 20 in FIG. 2 represent the material that is removed during machining. If FIGS. 1 and 2 are compared on the same scale, it would be seen that the amount of material removed by machining is less for the manufacturing process partially depicted in FIG. 2 as compared to that partially depicted in FIG. 1.

The structural members seen in FIG. 2 can be joined by linear friction welding. As is well known, in a linear friction welding process, respective surfaces of two parts are placed in contact with each other to form an interface and then rubbed together in a reciprocating manner, as indicated by the double-headed arrow in FIG. 4. This is accomplished by moving at least one of the parts back and forth along a line. As the parts are rubbed, compressive force is applied to place the interface under high pressure. At the interface, frictional heat is generated and material from each part plasticizes. Some of this material flows out from between the parts (flash flow), resulting in gradual decrease in the thickness, i.e. the dimension in the direction in which pressure is applied (the dimension normal to the interface) of the parts. When the process is terminated, flash flow ceases, and at the interface, the remaining plasticized material of each part cools and solidifies, thereby fusing the two parts together.

Curved structural assemblies can be formed from any number of structural members depending on the desired dimensions and configuration. Further, the configuration and material composition of the structural members can be formed and selected according to the specifications and design requirements of the final structural assembly.

In accordance with one implementation, each structural member of the tailored blank depicted in FIG. 2 is a polyhedron having two mutually substantially parallel faces that are substantially trapezoidal, two mutually substantially parallel faces that are substantially rectangles, and two non-parallel end faces that are substantially rectangles. In accordance with an alternative implementation, the substantially trapezoidal faces of each structural member are not mutually substantially parallel, in which case the end faces could be trapezoidal in shape. The word "substantially" in the phrase "substantially trapezoidal" is used in a sense intended to convey that the trapezoid may, for example, be rounded or chamfered at the four corners, meaning that four precise vertices are not required in order for a face of a structural member to qualify as trapezoidal.

Advantageously, the structural members 6, 8, 10, 12 can be standard stock items in inventory. As is known in the art, such structural members can be formed from a variety of fabricating processes such as milling, casting, die or hand forging, extruding, rolling, and machining. Also the structural members can be formed from materials having high strength-to-weight ratios and good corrosion resistance. For purposes of example only and not limitation, the structural members 6, 8, 10, 12 may comprise aluminum, aluminum alloys, titanium, titanium alloys, steel, nickel-based alloys, copper-based alloys, beryllium-based alloys, or mixtures thereof. Further, the structural members 6, 8, 10, 12 can be formed from similar or dissimilar materials (provided that the dissimilar materials are of types that can be welded together).

In addition to the material composition and properties of the structural members 6, 8, 10, 12, the sizes and shapes of structural members 6, 8, 10, 12 are selected based on the desired curvature of the final structural assembly. More specifically, the desired curvature of the final structural assembly can be determined first, and then the structural members 6, 8, 10, 12 can be selected so that the resulting tailored blank will correspond in configuration to the final structural assembly, i.e., the configuration of the tailored blank is such that material can be machined or otherwise removed or reconfigured to achieve the dimensions of the finished structural assembly. Advantageously, by constructing tailored blanks having dimensions and configurations closely or substantially approximating the predetermined dimensions and configuration of the corresponding desired final structural assembly, machining time and material waste can be minimized, making the finished structural assemblies more economical to produce.

The finished structural assemblies manufactured by the methods disclosed herein (such as structural assembly 24 depicted in FIG. 3) can be used as structural components of a vehicle, such as an aircraft, an automobile, or a marine craft. For example, a multiplicity of the structural assemblies can be joined to form a wing, wing support structure, fuselage frame, longeron, and the like of an airplane. Alternatively, the structural assemblies can be used in buildings, machinery, and the like.

Figure 4:
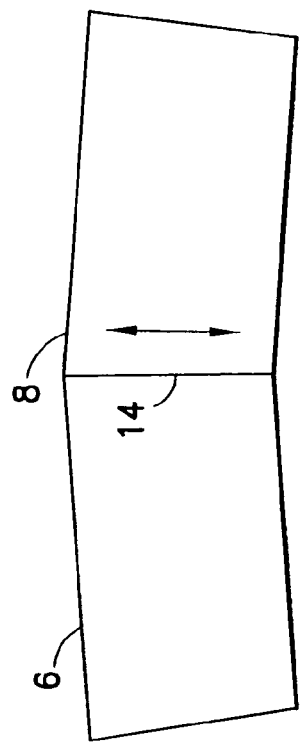
FIG. 4 is a drawing showing a planar view of two structural members being joined together by linear friction welding.

Referring again to FIG. 4, a first structural member 6 having a substantially trapezoidal profile is friction welded to a second structural member 8 by urging their end faces against each other and then causing the structural member 8 to move relative to the structural member 6 in a repeating pattern at a high frequency. For example, as shown in FIG. 4, the structural member 8 can be reciprocated in opposite directions (indicated by the double-headed arrow) along a line while being urged or pressed against the structural member 6. [Friction welding resulting from relative motion of the welded parts along a line will be referred to herein as "linear friction welding."] The structural member 8 can be urged against the structural member 6 and reciprocated by an actuator (not shown), such as an electric, hydraulic, or pneumatic actuator that is coupled to and engaged with the structural member 8 by means of a pair of adjustable jaws, clamps, a chuck, or other coupling device. The structural member 8 can be secured to the clamping device bolts, tack welding, tooling, or the like. In the case wherein jaws are employed, each jaw may be provided with a knurled gripping surface for securely gripping the structural member being friction welded. The actuator can oscillate the structural member 8 a distance of about 0.1 inch at a rate of about 60 hertz. Alternatively, other oscillation distances and frequencies can be used.

The frequency of the reciprocating movement and the applied pressure are selected to cause the materials at the surfaces being rubbed together to plasticize, reaching a state wherein the parts will become fused together when reciprocation ceases and the plasticized material is allowed to fuse while the pressure is still being applied. More specifically, the relative motion between the structural members 6 and 8 generates frictional heating that plasticizes a portion of the structural member 6 and/or a portion of the structural member 8. Once sufficient plasticization has occurred, the reciprocating motion of the structural members is terminated. Plasticization can be detected, for example, by mechanical or optical measurements, or friction welding can be continued for a predetermined duration based upon such factors as the type of materials being joined, the size or type of the joint to be formed, and the compressive force therebetween. After the relative motion of the structural members 6 and 8 has been terminated, the compressive force between them is maintained by continuing to urge one against the other, thereby forming a friction weld joint 14 when the plasticized material solidifies.

It is well understood that the forces and ranges of motion required for linear friction welding structural members together can vary according to such factors as the material, dimensions, surface finishes and the like of those members. For example, in accordance with one embodiment of the present invention, in which the structural members 6 and 8 are formed of aluminum, structural member 8 is urged against structural member 6 with a force sufficient to produce a pressure of about 20,000 psi therebetween, while the structural member 8 is reciprocated about 0.1 inch along a line.

In other embodiments of the invention, the structural members to be friction welded can undergo relative movement having some nonlinear component, e.g., such that the motion of the structural member 8 relative to the structural member 6 defines an elliptical path.

Figure 5:
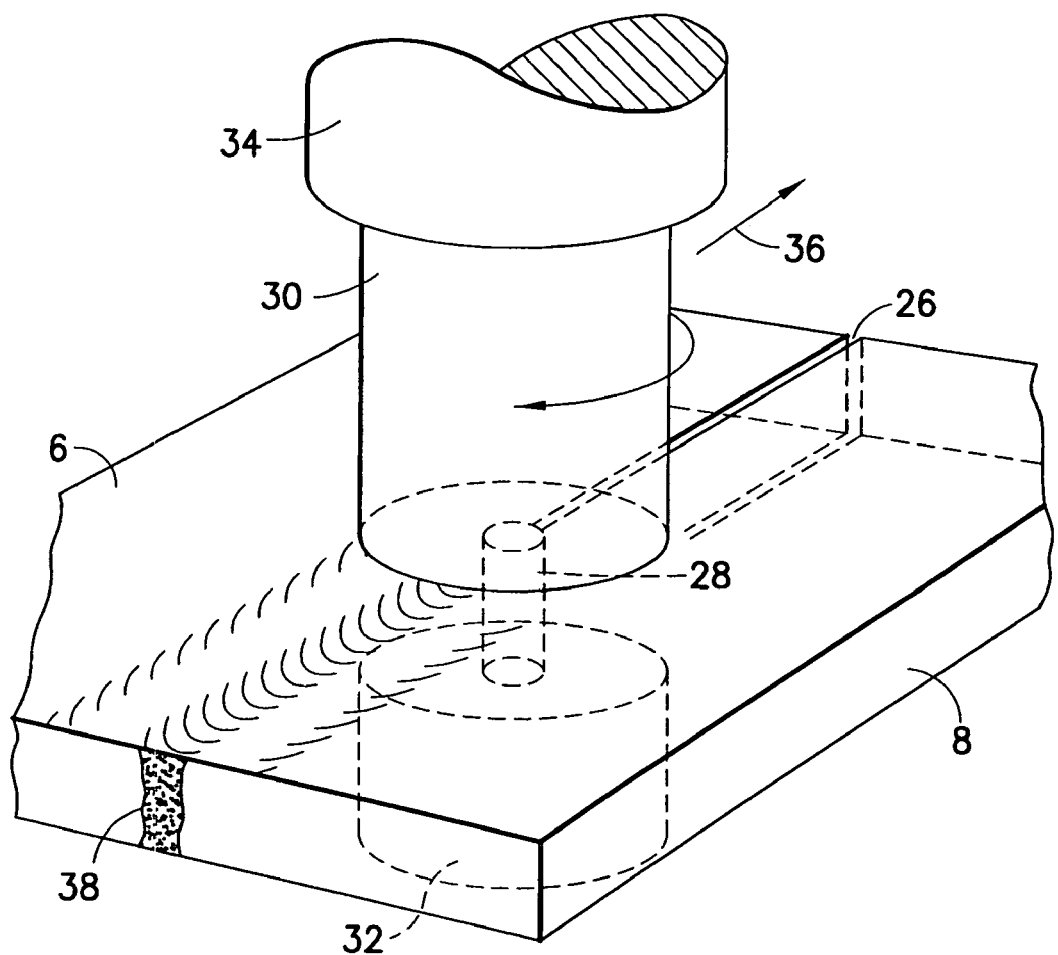
FIG. 5 is a drawing showing an isometric view of two structural members being joined by a friction stir welding tool.

Alternatively, the structural members can be joined by friction stir welding. For example, structural members 6 and 8 are shown in FIG. 5 being friction stir welded together by a rotatable friction stir welding tool. The structural members 6 and 8 are butted together about a joint line 26. A non-consumable tool having a narrow central, circular cylindrical necked portion 28 positioned between upper and lower shoulders 30 and 32 is brought to the edge of the joint line 26 between the structural members 6 and 8. The tool is rotated by a motor 34 while the tool is traversed in a direction 36 (by conventional linear displacement means not shown) and while the structural members 6 and 8 are held (e.g., by clamps not shown) against lateral movement away from the probe.

The rotating probe produces a local region of highly plasticized material around necked portion 28, while top and bottom constraint is provided by the shoulders 30 and 32. As seen in FIG. 5, the cooled plasticized material in the wake of the traveling tool forms a weld joint 38. Preferably, the constraining faces of the shoulders 30 and 32 are close fitting onto the structural members 6 and 8 to avoid loss of material from the plasticized zone. The friction stir welding tool can be manufactured in one piece as shown in FIG. 5, with a preset gap between the constraining faces of the shoulders 30 and 32.

Many modifications and other embodiments of the invention will come to mind to one skilled in the art to which this invention pertains having the benefit of the teachings presented in the foregoing descriptions and the associated drawings. For example, the structural members can be processed before and/or after joining by friction welding. Such processing can include cleaning the joining surfaces of the structural members to remove oxidation or surface defects. Additionally, the structural members can be heat treated by aging, quenching, stretching, annealing, or solution annealing to obtain desired mechanical or chemical properties, as is known in the art.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiments disclosed, but that the invention will include all embodiments falling within the scope of the appended claims.

The invention claimed is:

1. A method of making a curved structural assembly comprising the following steps:
   (a) arranging first and second polygonal plates so that said first and second plates are coplanar and one side of said first plate is in contact with one side of said second plate;
   (b) friction welding said first and second plates together along a first interface formed by said contacting sides of said first and second plates, said friction-welded first interface forming a first weld joint;
   (c) arranging a third polygonal plate so that said third plate is coplanar with said first and second plates, one side of said third plate is in contact with another side of said second plate, and said first through third plates approximate a segmented arc, each of said first, second and third plates being a respective segment of said segmented arc;
   (d) friction welding said second and third plates together along a second interface formed by said contacting sides of said second and third plates, said friction-welded second interface forming a second weld joint;
   (e) machining said first, second and third plates to form an inner curved contour that intersects said first and second weld joints; and
   (f) machining said first, second and third plates to form an outer curved contour that intersects said first and second weld joints.

2. The method as recited in claim 1, wherein said friction welding steps are carried out using linear friction welding.

3. The method as recited in claim 1, wherein said friction welding steps are carried out using friction stir welding.

4. The method as recited in claim 1, wherein said first, second and third plates have substantially the same size and shape.

5. The method as recited in claim 1, wherein said first, second and third plates have substantially trapezoidal profiles, with long bases of said trapezoids disposed along an outer periphery of said segmented arc and short bases disposed along an inner periphery of said segmented arc.

6. The method as recited in claim 1, wherein said first, second and third plates have the same thickness.

7. The method as recited in claim 1, wherein said inner and outer curved contours are respective arcs.

* * * * *